(12) United States Patent
Pobee-Mensah

(10) Patent No.: US 6,763,953 B1
(45) Date of Patent: Jul. 20, 2004

(54) STORAGE AND RETRIEVAL SYSTEM FOR MEDIA DISKS

(76) Inventor: Anthony E. Pobee-Mensah, 3324 Ashby Pl., Raleigh, NC (US) 27604

( * ) Notice: Subject to any disclaimer, the term of this patent is extended or adjusted under 35 U.S.C. 154(b) by 0 days.

(21) Appl. No.: 10/261,402

(22) Filed: Oct. 1, 2002

(51) Int. Cl.[7] .............................................. A47G 29/00
(52) U.S. Cl. ....................... 211/40; 211/124; 312/9.53
(58) Field of Search .......................... 211/40, 123, 124, 211/113, 169, 169.1, 47, 48, 183, 105.1; 248/214, 251; 206/307.1, 308.1; 16/87.4 R; 312/9.1, 9.4, 9.9, 9.47, 9.48, 9.58, 9.59, 9.61, 9.53, 9.55, 9.52

(56) References Cited

U.S. PATENT DOCUMENTS

| | | | | |
|---|---|---|---|---|
| 3,149,811 A | * | 9/1964 | Fremstad et al. ............ 248/251 |
| 3,207,318 A | * | 9/1965 | Gilbert ......................... 211/40 |
| 3,430,775 A | * | 3/1969 | Fleischman ................. 211/123 |
| 3,635,352 A | * | 1/1972 | Brooks et al. ................ 211/47 |
| 3,759,398 A | * | 9/1973 | Romney ...................... 211/46 |
| 4,155,607 A | * | 5/1979 | Sitler et al. ................. 312/184 |
| 4,190,927 A | * | 3/1980 | Hepperle ................... 16/96 D |
| 4,305,510 A | * | 12/1981 | Eppy ............................ 211/40 |
| 4,327,952 A | * | 5/1982 | Cournoyer et al. ......... 312/184 |
| 4,426,007 A | * | 1/1984 | Beleckis et al. .............. 211/40 |
| 4,515,420 A | * | 5/1985 | Grosch ...................... 312/9.59 |
| 4,579,231 A | * | 4/1986 | Price ........................ 211/41.12 |
| 4,895,332 A | * | 1/1990 | Hansen et al. .............. 248/251 |
| 5,078,207 A | * | 1/1992 | Asano et al. ................ 165/166 |
| 5,322,162 A | | 6/1994 | Melk |
| 5,421,059 A | * | 6/1995 | Leffers, Jr. ................ 16/87.4 R |
| 5,495,953 A | * | 3/1996 | Bearth .......................... 211/40 |
| 5,584,397 A | * | 12/1996 | Cheng .......................... 211/40 |
| 5,593,032 A | * | 1/1997 | Staley ......................... 206/309 |
| 5,697,684 A | * | 12/1997 | Gyovai ...................... 312/9.42 |
| 5,702,010 A | * | 12/1997 | Liang ...................... 211/105.1 |
| 5,713,463 A | | 2/1998 | Lakoski et al. |
| 5,833,082 A | * | 11/1998 | Barthel ........................ 211/47 |
| 5,931,315 A | * | 8/1999 | Lorentz et al. ............... 211/40 |
| 6,176,378 B1 | * | 1/2001 | Neubauer et al. ........... 211/113 |
| 6,502,703 B2 | * | 1/2003 | Scherer et al. ................ 211/40 |
| 2002/0195409 A1 | * | 12/2002 | Ku .............................. 211/40 |

* cited by examiner

*Primary Examiner*—Jennifer E. Novosad
(74) *Attorney, Agent, or Firm*—Coats & Bennett, PLLC

(57) ABSTRACT

A storage and retrieval system primarily adapted for the convenient storage and retrieval of media disks includes a plurality of disk enclosures releaseably supported in a hanging fashion from a rod via a plurality of hanger assemblies. The rod has a plurality of grooves and the hanger assemblies have at least two inwardly extending tabs that engage the grooves. The hanger assemblies have an upper section that includes the tabs, and an elongate docking member attached to and disposed below the upper section. The docking member includes a generally downwardly opening channel having a wider main section disposed above a constricted section. The disk enclosures each have a generally elongate docking section that are adapted to releasably engage the docking member such that the disk enclosures are releasably supported in a hanging fashion from the rod with limited rotational movement about the axis of the rod.

20 Claims, 7 Drawing Sheets

STORAGE AND RETRIEVAL SYSTEM FOR MEDIA DISKS

FIELD OF THE INVENTION

The present invention is directed to storage and retrieval systems for information carrying disks, such as compact disks and DVD disks.

BACKGROUND OF THE INVENTION

Compact disks (CDs) have become a wildly popular format for distributing music, software, and the like. Likewise, DVD disks have become very popular format for video and audio programs. Indeed, a typical consumer owns tens, if not hundreds, of such disks. As can be appreciated, storing numerous such disks in fashion that they can be readily retrieved has become a problem. One typical approach is to store each disk in its original rectangular clamshell ("jewel") case, with the cases either stacked side-by-side on a horizontal shelf (or shelves) or placed into vertically or horizontally aligned grill-type slots. However, it is becoming more popular to distribute or otherwise store such disks in generally round containers. Such round containers are not easily handled by earlier storage systems, as they are not readily stackable and tend to fall through common grill-type slots.

As such, there remains a need for alternative storage and retrieval systems, particularly ones adapted for the generally round cases being increasingly employed to protect information carrying disks such as CDs and DVDs.

SUMMARY OF THE INVENTION

The present invention is directed to a storage and retrieval system primarily adapted for the convenient storage and retrieval of media disks, such as CDs, DVDs, and the like. The system typically includes a plurality of disk enclosures releaseably supported in a hanging fashion from a rod via a plurality of hanger assemblies. The rod has a plurality of grooves and the hanger assemblies have at least two inwardly extending tabs that slidably engage the grooves. The hanger assemblies have an upper section that includes the tabs, and an elongate docking member attached to and disposed below the upper section. The docking member includes a generally downwardly opening channel having a relatively wider main section disposed above a relatively narrower constricted section. The disk enclosures each have a generally elongate docking section that are adapted to releasably engage the docking member such that the disk enclosures are releasably supported in a hanging fashion from the rod with limited rotational movement about the axis of the rod. While the rotational movement is limited, the lateral movement of the disk enclosures with respect to rod preferably is not. Indeed, it is intended that disk enclosures of most embodiments will be readily slidable bidirectionally along the rod generally parallel to its axis, with the tabs sliding in the corresponding grooves.

The number of hanger assemblies may be limited, based on their width and the length of rod, so that adequate space is provided for laterally sliding the hanger assemblies relative to the rod for viewing content labels on the disk enclosures and the like.

DETAILED DESCRIPTION OF THE INVENTION

Figure 1:
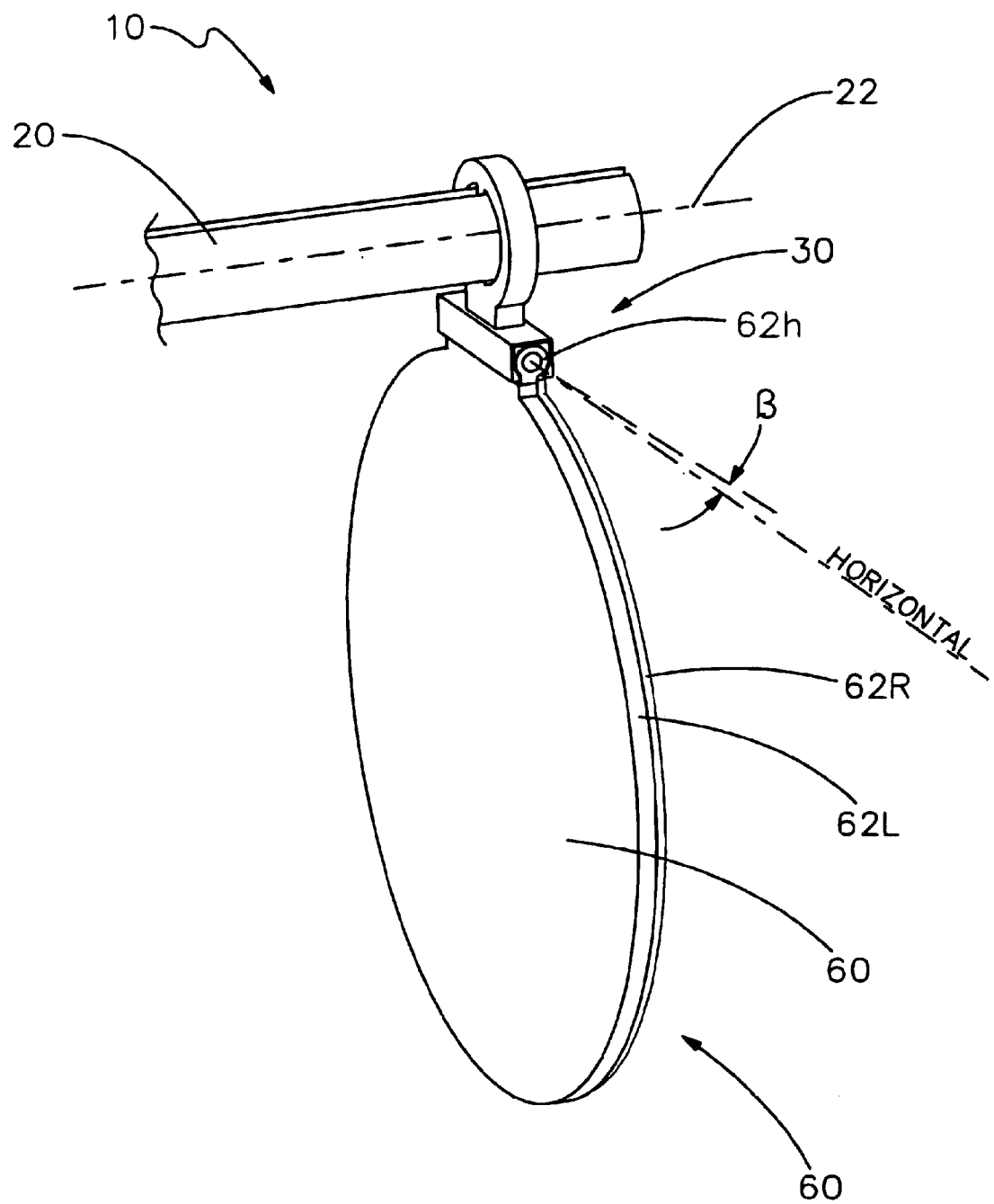
FIG. 1 shows a single disk enclosure hanging from the rod via a hanger assembly according on one embodiment of the present invention.
Figure 2:
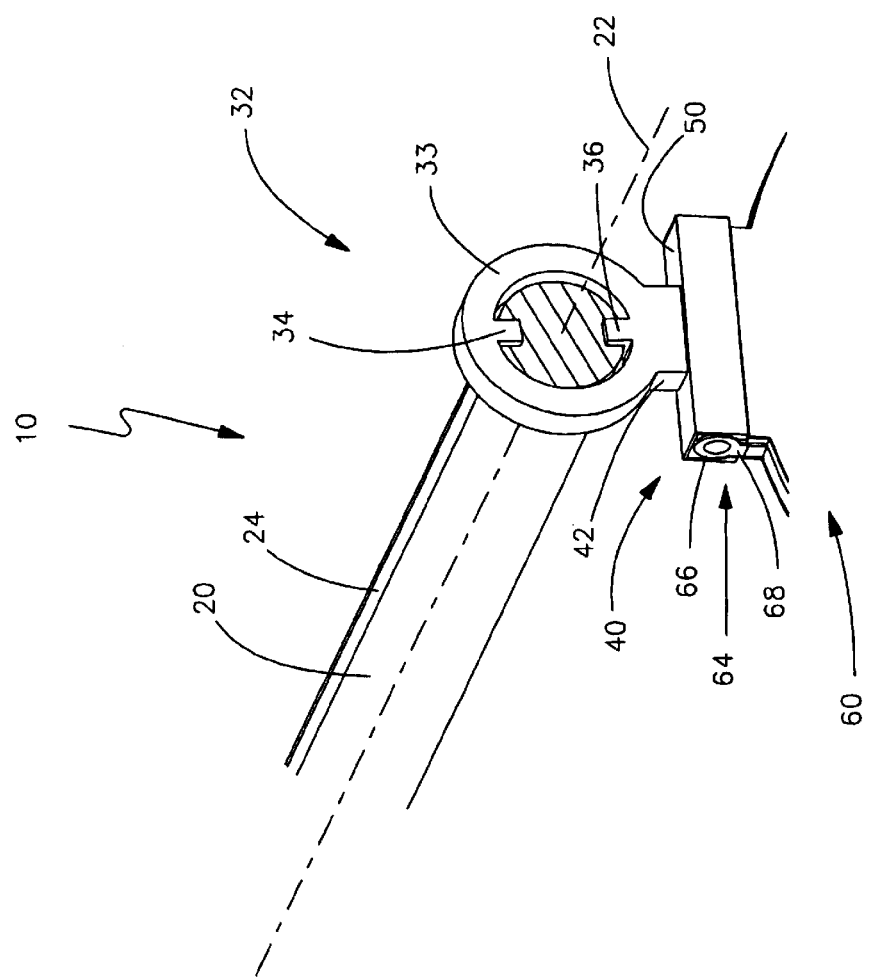
FIG. 2 shows a partial perspective view from above of the interconnections between a rod, a hanger assembly, and a disk enclosure of FIG. 1.
Figure 3:
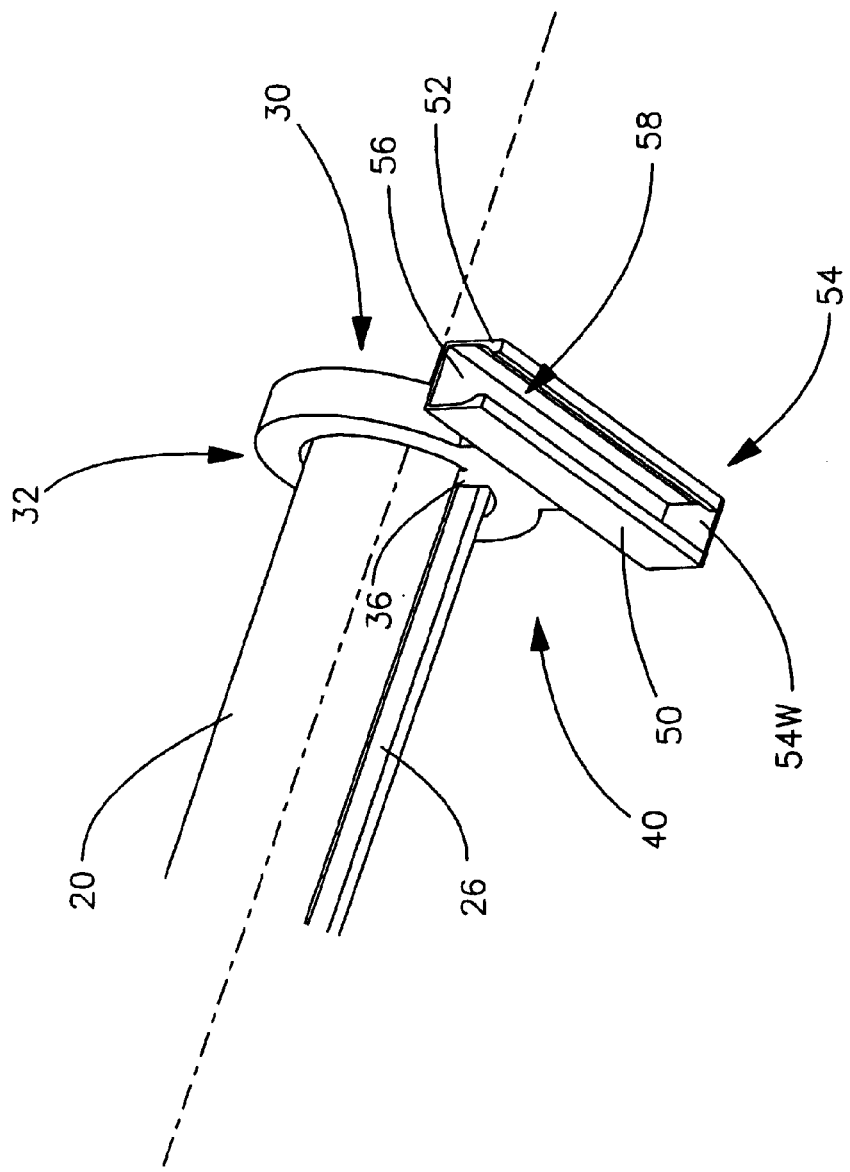
FIG. 3 is a partial perspective view from below of the arrangement of FIG. 2 with the disk enclosure removed for clarity.
Figure 4:
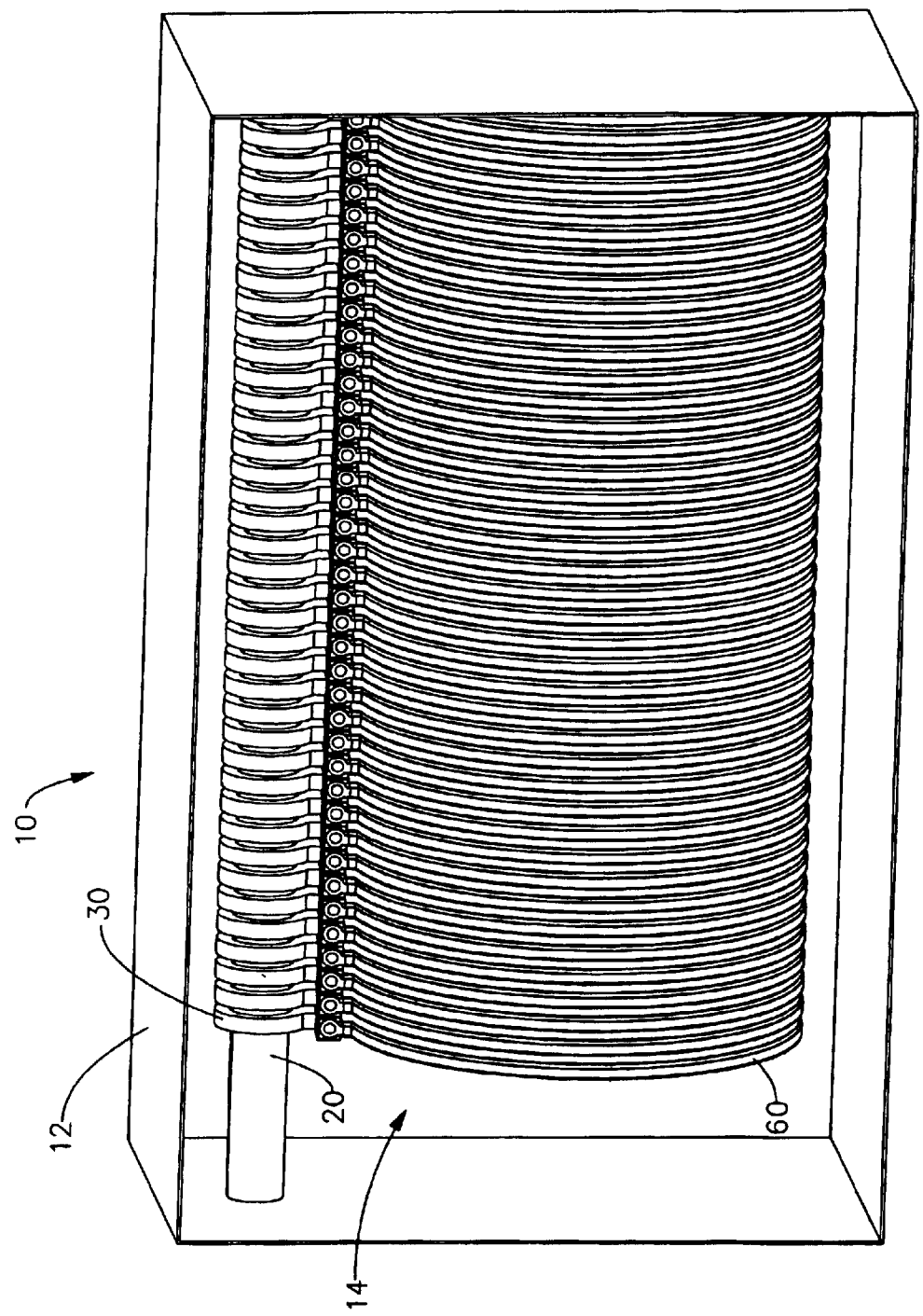
FIG. 4 shows one embodiment of a storage and retrieval system according to the present invention.

The present invention relates to a storage and retrieval system primarily adapted for the convenient storage and retrieval of media disks, such as CDs, DVDs, and the like. The system, generally indicated at 10, typically includes a plurality of disk enclosures 60 releaseably supported in a hanging fashion from a rod 20 via a plurality of hanger assemblies 30. Referring to FIGS. 1–3, the support rod 20 is typically an elongate cylindrical body that extends along a longitudinal axis 22. The surface of the rod 20 includes a plurality of grooves, including a primary groove 24 and a secondary groove 26. While not required, the primary groove 24 may be advantageously located on the upper side of rod 20, while secondary groove 26 may be advantageously located approximately 180° away on the lower side of rod 20. The grooves 24,26 are preferably approximately square in cross-section, but may be narrower or wider as desired. While not required, the rod 20 may advantageously be supported end-wise by a suitable case 12, as shown in FIG. 4. If used, the case 12 should include a suitable opening 14 on its "front" face that allows access to the disk enclosures 60 along substantially the entire length of rod 20.

The hanger assemblies 30 include an upper section 32 disposed generally perpendicular to the longitudinal axis 22 of the rod 20, and a docking member 40 supported by the upper section 32. The upper section 32 typically takes the form of an annular ring 33 that surrounds the rod 20. As such, the center opening in the upper section 32 is advantageously similar in shape, but slightly larger than, the cross-sectional shape of the rod 20. In addition, the upper section 32 includes at least two inwardly extending tabs 34,36 that are configured to fit within the corresponding grooves 24,26 on the rod 20. The docking member 40 of the preferred embodiment includes a downwardly opening channel 50 that is secured to the upper section 32 of the hanger assembly 30 by a neck portion 42. The channel 50 is preferably generally elongate and extends in a direction generally perpendicular to longitudinal axis 22. As best seen in FIG. 3, the cross-section of channel 50 includes a main section 56 and a constricted section 58 that is narrower than the main section 56. The main section 56 is disposed above the constricted section 58 and is sized to receive the wide portion 66 of the docking section 64 of the disk enclosure 60, as discussed further below. The constricted section 58 is typically formed from opposing bosses on the inner surface of the channel 50 and is sized to be larger than the narrow portion 68 of the docking section 64 of the disk enclosure 60, but narrower than the wide portion 66. In preferred embodiments, the channel 50 includes a wall 54w on one end 54 thereof and is disposed at a non-horizontal angle β such that the open end 52 is slightly higher than the closed end 54.

The disk enclosures 60 are typically of the clamshell type, with the relevant disk secured between opposing clamshell portions 62L,62R of a main body 62 connected by a hinge 62h on one side and closed by suitable snaps (not shown). The hinge structures 62h of such enclosures 62 typically lie outside the footprint of the disk and have a generally round profile. The present invention may advantageously use this hinge structure 62h as a docking section 64, with the wider parts 66 thereof fitting within the main section 56 of the channel 50 and the narrower parts 68 thereof disposed in the constricted section 58 of the channel 50. While such disk enclosures 60 have numerous other design features known in the art, such as centering mechanisms on the interior thereof and the like, such details are unimportant for understanding the present invention and are therefore omitted for the sake of brevity. It should be noted that such disk enclosures 60 are commercially available from numerous suppliers such as Verbatim, Maxell, and Memorex.

To use one embodiment of the system 10 described above, the information disk is mated to the disk enclosure 60 in the typical fashion. Then the docking section 64 of the disk enclosure 60 is inserted into the open end 52 of the hanger assembly's channel 50. The docking section 64 slides in the channel 50, with the wide section 66 of the disk enclosure's docking section 64 moving within the main section 56 of the channel 50 and the narrow section 68 of the disk enclosure's docking section 64 moving within the constricted section 58 of the channel 50. The docking section 64 is preferably inserted into the channel 50 until it encounters the wall 54w at the closed end 54 of the channel 50. The weight of the disk enclosure 60 tends to pull the hanger assembly 30 downward; and, when the channel 50 is tilted with respect to horizontal (e.g., at angle β), the disk enclosure 60 tends to apply a force tending to rotate the hanger assembly 30 about the longitudinal axis 22 of the rod 20. However, the presence of the tabs 34,36 in the grooves 24,26 tends to resist this rotation, with the resulting rotational movement, if any, limited to that allowed by the relative fit between the tabs 34,36 and their respective grooves 24,26. Thus, the disk enclosures 60 are prevented from swinging any substantial amount back-and-forth about the longitudinal axis 22. Further, the interaction of the tabs 34,36 and grooves 24,26 may advantageously cause the open end 52 of the channel 50 to be oriented slightly upward with respect to horizontal (e.g., at angle β), so as to allow easy insertion and removal of the disk enclosure 60. While the rotational movement is limited, the lateral movement of the disk enclosures 60 with respect to rod 20 preferably is not. Indeed, disk enclosures 60 should preferably be readily slidable bidirectionally along rod 20 generally parallel to axis 22, with the tabs 34,36 sliding along the corresponding grooves 24,26.

With the disk enclosures 60 hung from the hanger assemblies 30, the user is free to slide the disk enclosures 60 laterally, so as to be able to view corresponding labels or other indicia of the disk enclosure's content. When the desired disk enclosure 60 is selected, its disk enclosure 60 may be easily removed from the hanger assembly 30 by sliding the docking section 64 out from the corresponding channel 50. Thus, full or empty disk enclosures 60 may be easily added or removed from the rod and hanger assembly 20,30 for purposes of storage or retrieval.

In some embodiments, the number of hanger assemblies 30 may be limited based on their width and the length of rod 20, so that adequate space is provided for laterally sliding the hanger assemblies 30 relative thereto for viewing content labels and the like. For instance, if the length of the rod 20 is L and the hanger assemblies 30 have a thickness (measured along axis) of T, then the maximum number of hanger assemblies 30 N may be set such that N<UT. Indeed, it may be advantageous to "leave out" not just one, but several hanger assemblies 30, such that $(N-1)<L/T$ or $(N-3)<L/T$, and so forth.

Figure 5:
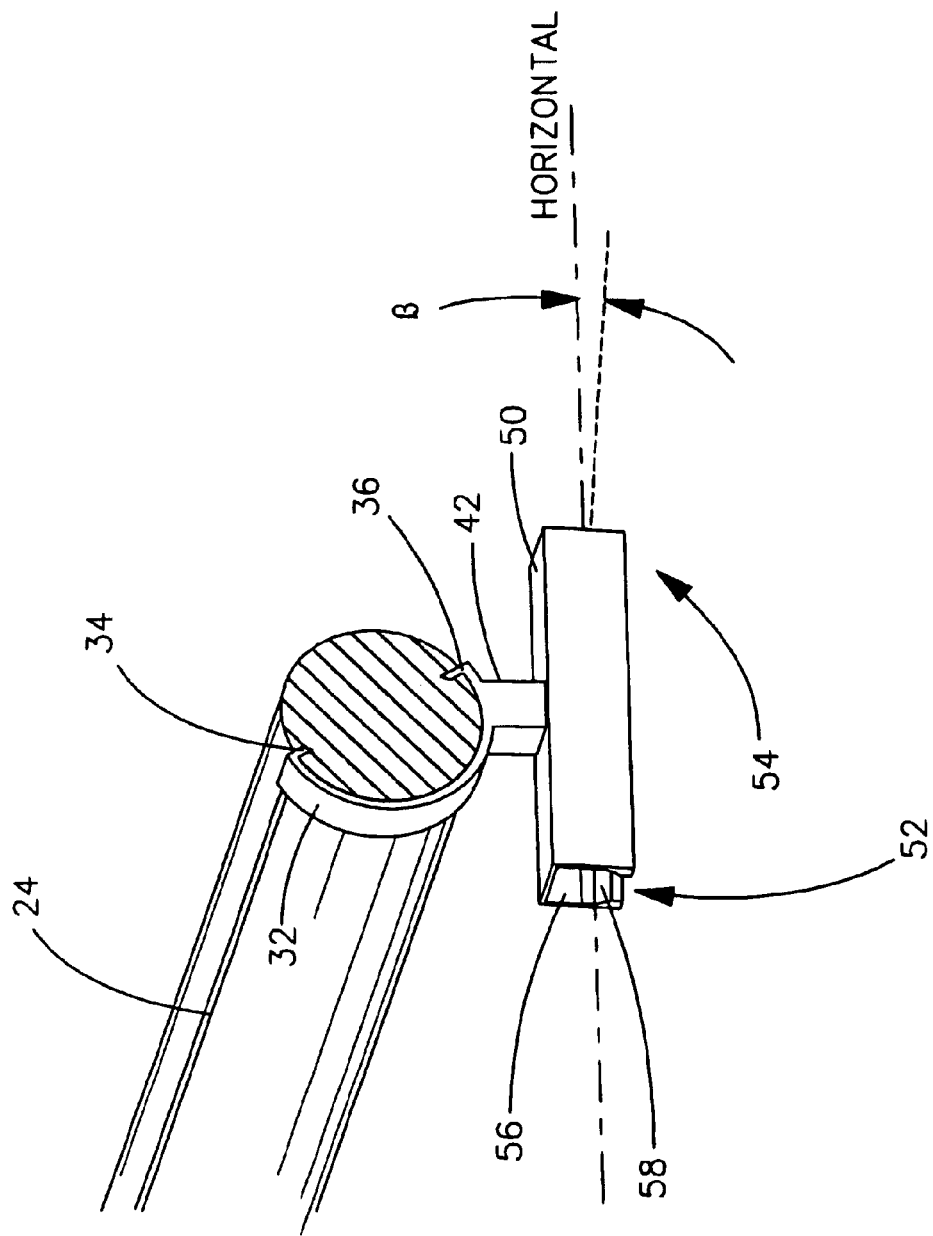
FIG. 5 shows a partial perspective view from above of the interconnections between a rod and a hanger assembly of a second embodiment.

Another embodiment of the system 10 is shown in FIG. 5. This embodiment is similar to that shown in FIGS. 1–4, but with the upper section 32 of the hanger assembly 30 disposed about only a portion of the surface of rod 20, rather than surrounding the same. Further, the tabs 34,36 and grooves 24,26 are shown as being located offset from the preferred vertical configuration. Also, while not shown, it should be noted that the tabs 34,36 may be disposed at locations other than 180° apart, but approximately 180° opposition is believed most advantageous.

Figure 6:
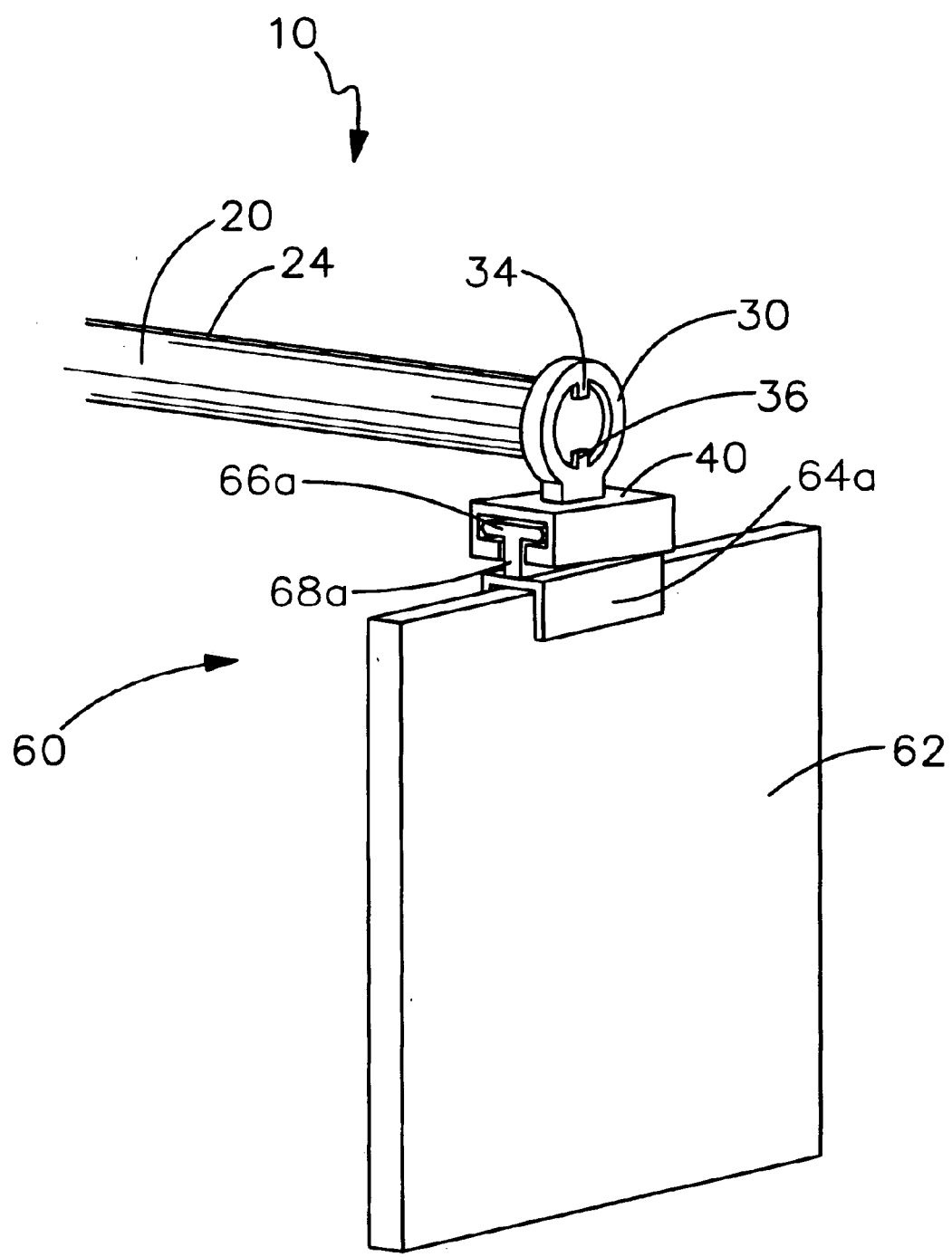
FIG. 6 shows a partial perspective view from above of the interconnections between a rod, a hanger assembly, and a disk enclosure of a third embodiment.
Figure 7:
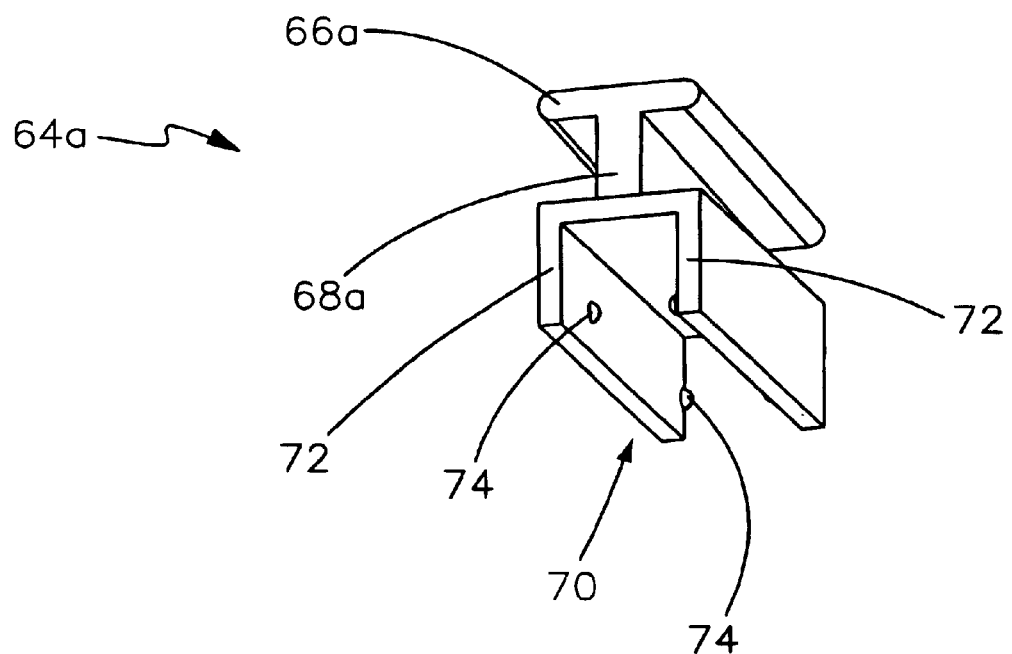
FIG. 7 shows a partial perspective view of a docking section of the disc enclosure of the embodiment of FIG. 6.

Yet another embodiment of the system 10 is shown in FIGS. 6–7. This embodiment is likewise similar to that shown in FIGS. 1–4, but with the disk enclosure 60 having a distinct docking section 64a mated to the main body 62 of the disk enclosure 60. This version of the docking section 64a includes a wide section 66a and a narrow section 68a, and also includes a grip area 70 for gripping the main body 62 of the disk enclosure 60. The grip area 70 may be in the form of a pair of downwardly extending flanges 72 having bumps 74 on their inner surfaces. The bumps 74 are intended to engage corresponding depressions (or holes, neither shown) on the main body 62 of the disk enclosure 60. The docking section 64a is attached to the main body 62 of the disk enclosure 60, with the flanges 72 temporarily deflecting outward until the bumps 74 rest in the corresponding depressions on the main body 62, and the combined disk enclosure 60 is utilized as described above. One particular advantage of this embodiment is that the docking section 64a may be added to the traditionally employed rectangular CD cases, commonly referred to as "jewel cases." While these distinct type docking sections 64a may be removable from the main body 62 of the disk enclosure 60, such as by using the snap-fit bump/depression approach described above, the distinct docking section 64a may also be more permanently attached to the main body 62, such as by adhesives, double sided tape, or the like.

While the rod 20, hanger assemblies 30, and disk enclosures 60 may be made from a wide variety of materials, such as metal, wood, etc., it is believed that plastic materials such as polycarbonate, ABS, polypropylene, or polystyrene are probably most advantageous.

The discussion above has assumed that the hanger assemblies 30 are substantially identical to one another. However, this is not required. For instance, some hanger assemblies 30 may be made thicker to handle larger loads, may be color coded, and the like. If the hanger assemblies 30 are not substantially structurally identical, such as some being thicker and some being thinner, then it may be useful to alter the calculations for the maximum number of hanger assemblies 30 accordingly.

The present invention may, of course, be carried out in other specific ways than those herein set forth without departing from the essential characteristics of the invention. For example, while the rod 20 preferably has a generally circular cross-section, such is not required, and the rod 20 may have a rectangular cross-section, or any other cross-sectional shape. Further, the rod 20 may be unitary, or may be of a telescoping type, etc. The present embodiments are, therefore, to be considered in all respects as illustrative and not restrictive, and all changes coming within the meaning and equivalency range of the appended claims are intended to be embraced therein.

What is claimed is:

1. A storage and retrieval system, comprising:
   a rod having upper and lower grooves therein, said rod extending along a first axis;
   a plurality of hanger assemblies slidably supported by said rod, each said hanger assembly comprising:
      an upper section disposed about said rod generally perpendicular to said axis, said upper section having first and second inwardly extending tabs slidably engaging said upper and lower grooves respectively;
      an elongate docking member attached to and disposed below said upper section, said docking member comprising a generally downwardly opening channel having a main section of a first width disposed above a constricted section of a second width less than said first width;
   a plurality of disk enclosures each having a generally elongate docking section; and
   wherein said docking sections of said disk enclosures are adapted to releasably engage said docking member such that said disk enclosures are releasably supported in a hanging fashion from said rod with limited rotational movement about said axis.

2. The system of claim 1 wherein said disk enclosures further comprise hingably connected first and second clamshell portions.

3. The system of claim 1 wherein said channel of said docking member further comprises an open end and a closed end.

4. The system of claim 3 wherein said tabs and said grooves inter-engage to constrain said closed end to be lower than said open end.

5. The system of claim 1 wherein said hanger assemblies have a maximum thickness along said axis and a count of said hanger assemblies satisfies the equation $N<L/T$, where N is said count of hanger assemblies, L is the length of the rod along said axis, and T is said thickness.

6. The assembly of claim 5 wherein said count satisfies the equation $(N-1) <L/T$.

7. The assembly of claim 1 wherein said tabs are disposed approximately 180° apart about said rod.

8. The assembly of claim 1 wherein said upper section further comprises an annular ring and said tabs extend inwardly from said ring.

9. The system of claim 1 further comprising an enclosure supporting said rod, said enclosure having an opening allowing access to said disk enclosures along substantially the entire length of said rod.

10. The system of claim 1 wherein said plurality of hanger assemblies are substantially identical in structure.

11. The system of claim 1 wherein each of said docking sections of said disk enclosures includes a wide section disposed above a narrow section, said wide section narrower than said first width and wider than second width, said narrow section narrower than said second width.

12. The system of claim 1 wherein said disk enclosures are removable from said hanger assemblies by sliding said docking sections along said channels.

13. The system of claim 1 wherein said disk enclosures comprise a main body removably mated to said docking section.

14. The system of claim 13 wherein said docking section comprises a plurality of downwardly extending flanges disposed on opposing sides of said main body and a wide section disposed above a narrow section, said wide section narrower than said first width and wider than second width, said narrow section narrower than said second width.

15. A storage and retrieval system, comprising:
   a rod having upper and lower grooves therein, said rod extending along a first axis;
   a plurality of hanger assemblies slidably supported by said rod, each said hanger assembly substantially identical in structure and comprising:
      an upper section disposed about said rod generally perpendicular to said axis, said upper section comprising an annular ring and first and second tabs extending inwardly therefrom, said first and second tabs slidably engaging said upper and lower grooves respectively;
      an elongate docking member attached to and disposed below said upper section, said docking member comprising a generally downwardly opening channel having a main section of a first width disposed above a constricted section of a second width less than said first width, an open end, and a closed end;
   a plurality of disk enclosures each having a generally elongate docking section including a wide section disposed above a narrow section, said wide section narrower than said first width and wider than second width, said narrow section narrower than said second width;
   wherein said docking sections of said disk enclosures are adapted to releasably engage said docking member such that said disk enclosures are releasably supported in a hanging fashion from said rod with limited rotational movement about said axis;
   wherein said tabs and said grooves inter-engage to constrain said closed end to be lower than said open end; and
   wherein said disk enclosures are removable from said hanger assemblies by sliding said docking sections along said channels towards said open ends.

16. The system of claim 15 wherein said hanger assemblies have a maximum thickness along said axis and a count of said hanger assemblies satisfies the equation $N<L/T$, where N is said count of hanger assemblies, L is the length of the rod along said axis, and T is said thickness.

17. The assembly of claim 15 wherein said tabs are disposed approximately 180° apart about said rod.

18. The system of claim 15 further comprising an enclosure supporting said rod, said enclosure having an opening allowing access to said disk enclosures along substantially the entire length of said rod.

19. The system of claim 15 wherein said disk enclosures comprise a main body removably mated to said docking section, wherein said docking section comprises a plurality of downwardly extending flanges disposed on opposing sides of said main body.

20. A method of storing and retrieving information disks, comprising:
   providing a rod having upper and lower grooves therein, said rod extending along a first axis;
   slidably supporting a plurality of hanger assemblies on said rod, each said hanger assembly comprising:
      an upper section disposed about said rod generally perpendicular to said axis, said upper section having first and second inwardly extending tabs slidably engaging said upper and lower grooves respectively;
      an elongate docking member attached to and disposed below said upper section, said docking member comprising a generally downwardly opening channel having a main section of a first width disposed above a constricted section of a second width less than said first width;

providing a plurality of disk enclosures having the information disks therein, said disk enclosures each having a generally elongate docking section; and releasably engaging each said docking section of said disk enclosures by a corresponding said docking member of said hanger assembly such that said disk enclosures are releasably supported in a hanging fashion from said rod with limited rotational movement about said axis.

* * * * *